Nov. 17, 1925.  1,562,050
A. L. POWELL
TRANSMISSION FOR ENGINES
Filed Dec. 8, 1920   3 Sheets-Sheet 3
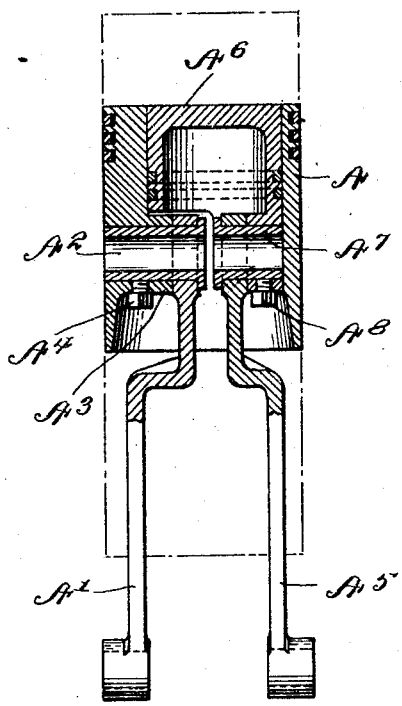
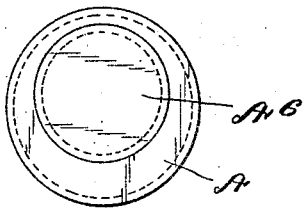
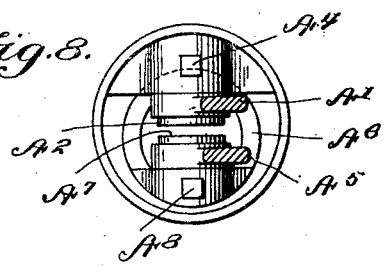
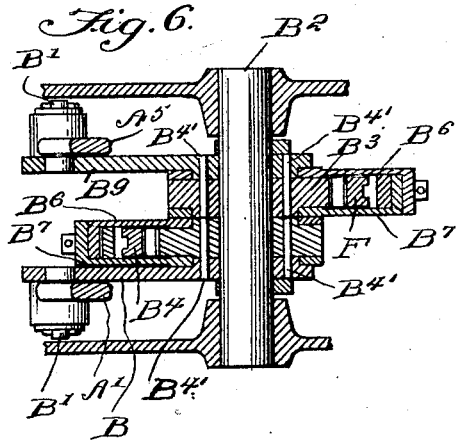
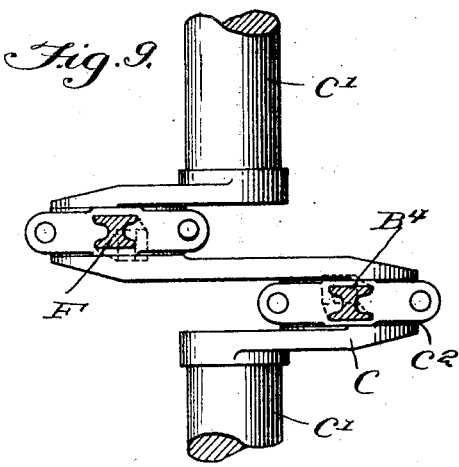
Inventor
Alvah L. Powell Patented Nov. 17, 1925.

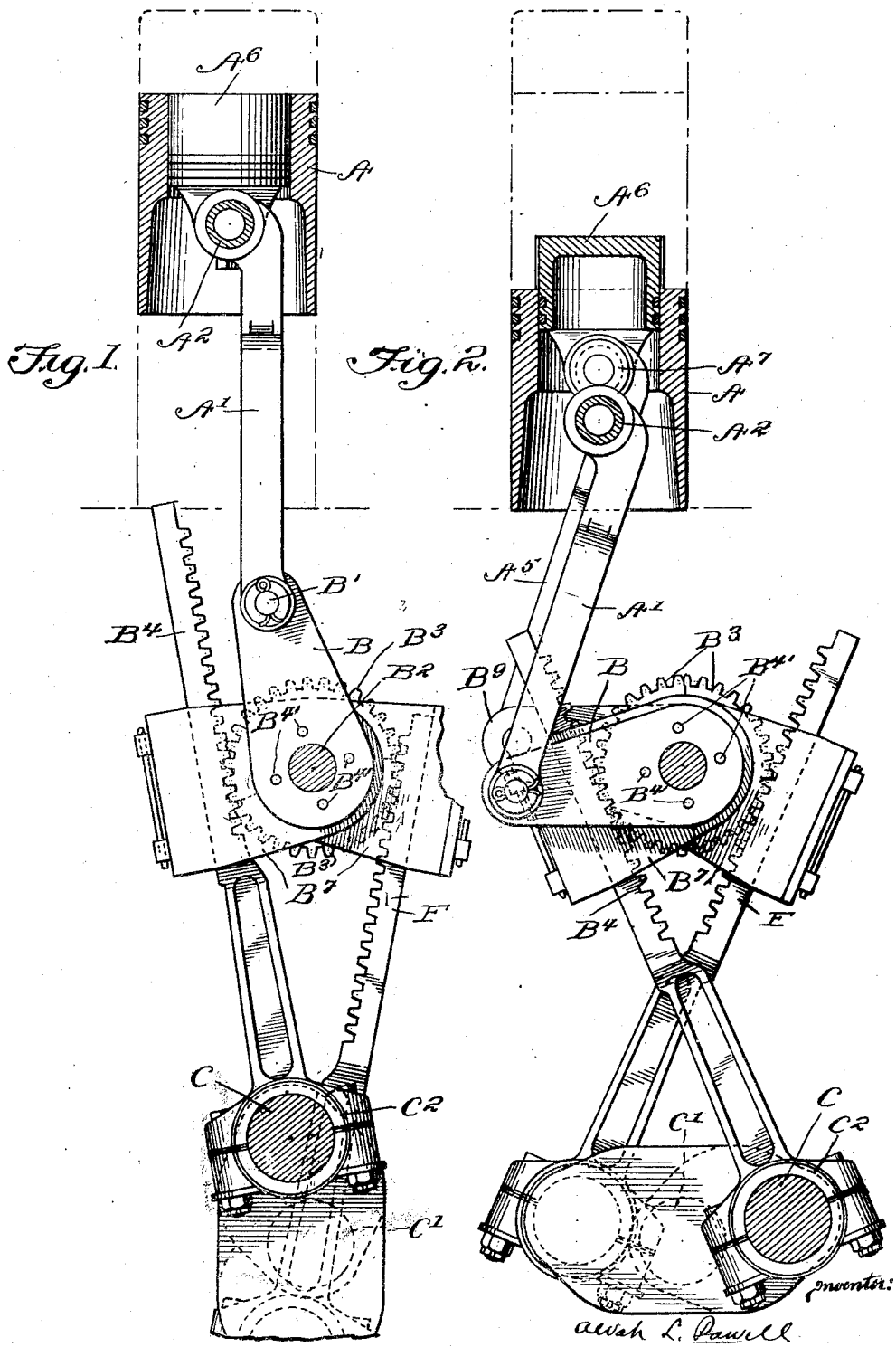

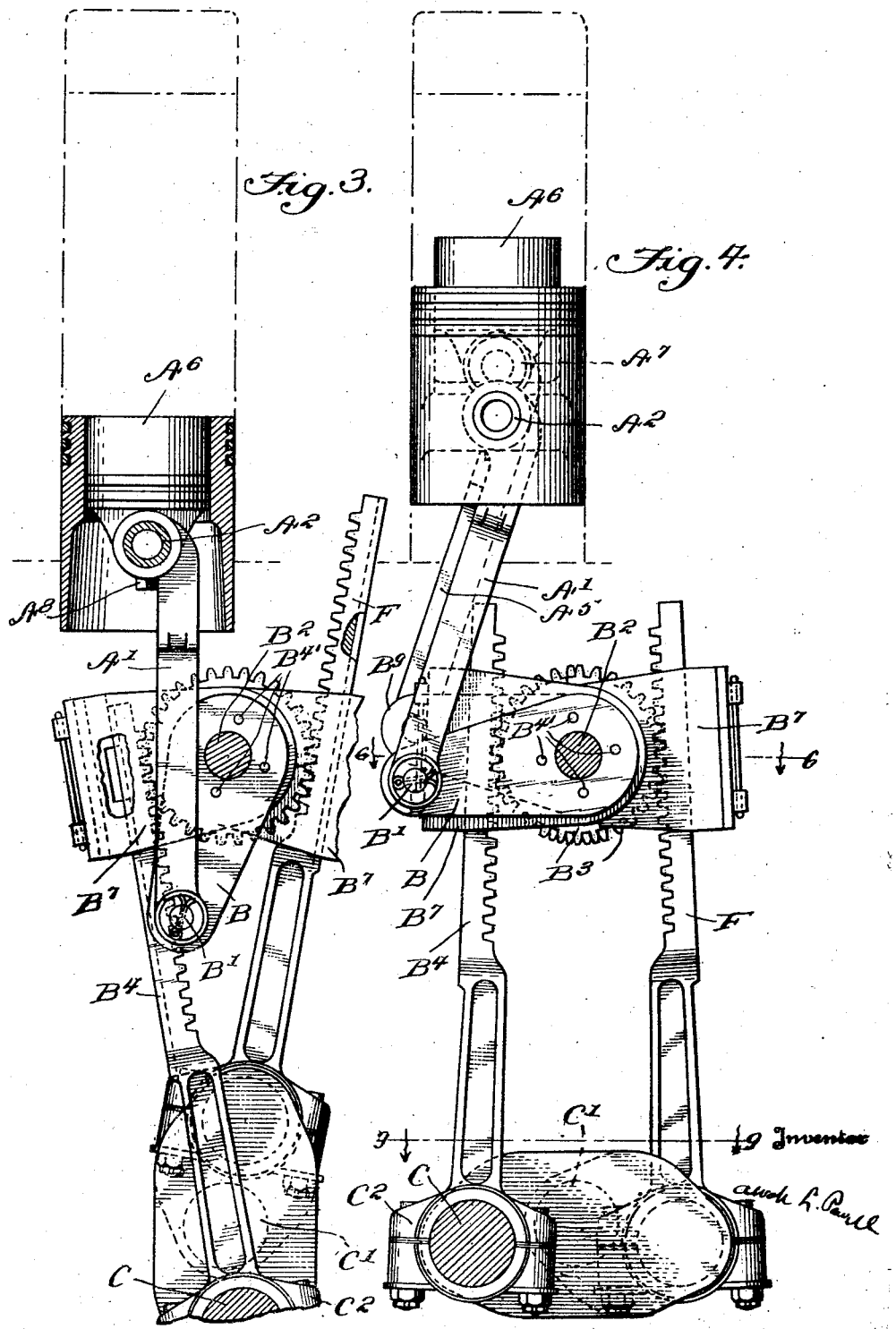

1,562,050

UNITED STATES PATENT OFFICE.

ALVAH L. POWELL, OF MILES CITY, MONTANA, ASSIGNOR, BY MESNE ASSIGNMENTS, TO THE A. L. POWELL POWER COMPANY, INC., OF MILES CITY, MONTANA, A CORPORATION OF MONTANA.

TRANSMISSION FOR ENGINES.

Application filed December 8, 1920. Serial No. 429,169.

*To all whom it may concern:*

Be it known that I, ALVAH L. POWELL, a citizen of the United States, residing at Miles City, in the county of Custer and State of Montana, have invented certain new and useful Improvements in Transmissions for Engines, of which the following is a specification.

My invention relates to improvements in the transmitting member of engines by which I secure a variation in the movement of the piston with reference to that of the crank, enabling me to gain advantages in the operation of such engines that are impossible with the constructions at present used. This application is somewhat similar to my application 429,168 filed simultaneously with it, but while the general principles involved are the same, I derive advantages from the improvements that are not covered in the other case. My specific improvement is the use of double cranks, set 180 degrees apart, by which I balance the effects of the explosion in the engine cylinder with reference to the engine structure, and I am able, further, to compensate for variations in the movement of my transmitting members, effecting, thereby, an increase in the general efficiency of an engine of this type. As the movement of any crank is variable as to pressure where actuated by a reciprocating means, there are points in the circle of motion where the crank rod moves at different speeds. In the engine about to be described, I balance this variation by adding a small piston to the main power piston, the two acting as a unit in receiving and transmitting the force developed by the expanding gases, but the addition of the secondary piston enables me to compensate for changes in pressure that would otherwise affect the transmitting member and, further, makes it possible to assure uniformity of pressure during the expansion stroke. The difference in stroke of piston with reference to that of crank stroke enables me to secure a greater expansion of the burning gas by reason of the added length of piston movement and, when compression is for a full intake of charge, that is, for full length of stroke, the preliminary compression is raised and a higher range of working pressure secured, while, at the same time, greater volume of the air and fuel elements results. This added power is transmitted to the crank, there following the concentration of a relatively greater piston stroke in the action of the power crank over that of the ordinary internal combustion engine of the same size. More perfect combustion is attained from the fact that the direct piston pressure is delivered against an intermediate crank, the length of which permits greater freedom of piston movement, because the effect of the reaction of the power crank against the piston is lowered as to average pressure. In addition to this, I secure the advantages enumerated by the use of a single structure, reducing weight and the space occupied, thereby.

In the accompanying drawings I show an application of the novel means I employ. In these—

Figs. 1 and 2 are elevational views.

Figs. 3 and 4 show the actuating cranks at different points of stroke.

Fig. 5 is a vertical section of the inner and outer pistons and rigidly attached connecting links.

Fig. 6 is a sectional view on the line 6—6 of Fig. 4 looking in the direction of the arrows.

Fig. 7 is a plan view of the inner and outer pistons, showing the eccentric relation of the pistons.

Fig. 8 is a plan view of the piston, showing the relative positions of connecting links.

Fig. 9 is a plan view of the cranks on the line 9—9 of Fig. 4.

In Fig. 2 the piston A of any gas engine of the four cycle type is attached to a piston rod, or link, $A^1$, by means of a pin, $A^2$, that passes through a lug $A^3$, Fig. 5, forming part of said piston. This pin is made, preferably, hollow and is held to the piston by a set screw, $A^4$, Figs. 5 and 8. For convenience the piston rods or links $A^1$, $A^5$, will hereafter be designated links, only. In the same piston A there is a bored passage in which moves a second piston, $A^6$, that is connected to a second link, $A^5$, by means of a hollow pin, $A^7$, and set screw $A^8$, (Fig. 5). These links move freely on the pins. The link $A^1$ is attached, at its opposite end, to a crank lever, B, Fig. 4, by means of a pin or stud, $B^1$. The crank lever B, is pivoted to rotate freely on a pin $B^2$, supported by any convenient means in the engine frame. The said crank lever B is attached rigidly to a segmental pinion B³ by means of rivets or screws, B⁴′, B⁴′, B⁴′, B⁴′, Fig. 2, so that both move in unison on pin B². Toothed connecting rods, B⁴ and F, engage the pinion B³, as shown in the various views in elevation. In order to provide for a free vertical and lateral motion of the rods B⁴ and F with reference to the pinions B³, I further employ a retaining means therefor. This consists of a grooved slide straddle bar, B⁶, Fig. 6, that is bored at one end to a free rotating fit on the hub of the segmental pinion B³, while at the opposite and closed end it fits over a similar bar, B⁷, the latter being bored to fit the pinion hub B³ on the opposite side. These two straddle bars are rotatable with reference to the pinion hub, and are attached to each other, forming one piece, by means of the screws or tap bolts. This construction is shown, clearly, in Fig. 6. The inner surfaces of the walls of the straddle bars form a plane passage, in which the toothed connecting rod, B⁴, slides freely, being held thereby to a proper engagement with the teeth of the pinion B³, in any position of its stroke, and at any angle of variation thereof. The lever crank and pinion are loosely mounted on the pin B², rotating freely thereon.

The connecting rod B⁴ is attached, at its lower end, to a crank C, on a crank shaft, C¹, by means of a cap, C², and suitably disposed cap bolts, or studs.

The link A⁵ of the secondary piston is connected with an independent crank lever and pinion, similar, in all respects, to that which has just been described, but by reason of the opposite positions of the toothed piston rod slides, and the independent movement of each on the pin B², the movement of each piston follows freely the directing pressure of the toothed connecting rod to which it is attached, or, conversely, effects an independent pressure on the said connecting rods which, in turn, is transmitted to the crank shaft, varying from the conditions of pressure and movement now to be described.

In Fig. 1 it will be noted that the position of the crank lever pin, B¹, is at a greater distance from the center of the pin B² than is the pitch radius of the segmental pinion B³. The movement of the center of the pin B¹ is therefore greater than a point on the pitch circle, the toothed connecting rod communicating a stroke to the crank shaft that is less than the stroke of the piston. By this means I utilize the leverage resulting from the difference in radii of the pressure arcs to exert through a crank of short stroke the power developed in a long stroke cylinder.

In Fig. 1 the engine is assumed to be at full compression, ready to develop its power stroke. The pistons move out, the crank lever B swinging downward. At the same time, the second crank, B⁹, Fig. 2, goes downward. In Fig. 2 the positions of the members are shown where the power piston A is producing maximum effect on the crank C, the latter being at half of its down stroke. While passing through that part of the crank arc of greatest mechanical effect, the inner piston has advanced to the position shown in Fig. 2 and, as the outer piston advances and increases the expansion space, the inner piston tends to maintain the expansion space at the point of greatest effectiveness. The volume in the cylinder is thus automatically controlled. In Fig. 3 the parts are shown at end of explosion stroke, the pistons then being in the same relative positions; that is they coincide. In Fig. 4 the pistons are advancing on exhaust stroke. It will be seen that by using the secondary piston I secure a distinct mechanical advantage, by reason of retaining relatively constant cylinder pressure at the point of greatest crank effectiveness.

In Fig. 7 I show the eccentric relation of the inner piston to the outer piston.

In Fig. 9 there is given, partly in section, a plan of the cranks and crank shaft.

Many forms of my invention are possible without departing from the general principles herein described.

What I claim as new and ask to have protected by Letters Patent, is—

1. In an engine of the class described, a cylinder, a reciprocating piston therein having a bore extending longitudinally therethru, an inner piston slidable within said bore, a rod member attached to each of said pistons, a crankshaft, a reciprocating crankshaft, operating members and gearing interposed between the rod members and the crankshaft operating members, whereby the stroke of the piston is greater than the diameter of the crank circle.

2. In an engine of the class described, a cylinder, a reciprocating piston therein having a bore extending therethru, an inner piston slidable within said bore, a rod member attached to said reciprocating piston, a rod member attached to said inner piston, a crankshaft, reciprocating crank shaft operating members, means interposed between the rod attached to said reciprocating piston and said crankshaft and means interposed between the rod attached to said inner piston and said crankshaft whereby the stroke of the piston is greater than the diameter of the crank circle.

3. In an engine of the class described, a cylinder, a reciprocating piston therein having a bore extending therethru, an inner piston slidable within said bore, a fulcrum, a lever and a pinion secured together and mounted on said fulcrum, a rod member extending from the reciprocating piston to the outer end of said lever, a crankshaft having a plurality of cranks thereon, a racked rod operatively connecting one of said cranks with said pinion, a second lever, a pinion rigidly secured thereto and mounted on said fulcrum, a link connecting the outer end of the last mentioned lever with said inner piston and means operatively connecting said second mentioned piston with a second crank on said crank shaft.

4. In an engine of the class described, a cylinder, a reciprocating piston therein having a bore extending therethru, an inner piston slidable within said bore, a fulcrum, a lever and a pinion secured together and mounted on said fulcrum, a rod member extending from the reciprocating piston to the outer end of said lever, a crankshaft having a plurality of cranks thereon, a racked rod operatively connecting one of said cranks with said pinion, a second lever, a pinion rigidly secured thereto and mounted on said fulcrum, a link connecting the outer end of the last mentioned lever with said inner piston, means operatively connecting said second mentioned piston with a second crank on said crankshaft, the length of each of said levers being greater than the pitch radius of either of said pinions whereby the stroke of the piston is greater than the diameter of the crank circle.

5. In an engine of the class described, a cylinder, a plurality of pistons slidable within said cylinder, one of said pistons being slidable within a bore extending thru the other of said pistons, a crankshaft having a plurality of cranks thereon, gearing interposed between each of said pistons and each of said cranks whereby the stroke of the piston is greater than the diameter of the crank circle.

6. In an engine of the class described, a cylinder, a reciprocating piston therein having a bore extending therethru, a rod member attached to said piston, a crankshaft, a reciprocating crankshaft operating member, gearing interposed between said members, whereby the stroke of the piston is greater than the diameter of the crank circle, a second reciprocating operating crank shaft member and gearing interposed between said second piston and said second reciprocating crankshaft operating member.

7. In an engine of the class described, a cylinder, a reciprocating piston therein having a bore extending therethru, an inner piston slidable within said bore, a crankshaft having two oppositely extending cranks thereon, means operatively connecting the two pistons with the two cranks respectively, said means including gearing whereby the stroke of the piston is greater than the diameter of the crank circle.

In testimony whereof I affix my signature.

ALVAH L. POWELL.